US012553258B2

(12) United States Patent
Yip et al.

(10) Patent No.: US 12,553,258 B2
(45) Date of Patent: Feb. 17, 2026

(54) LATCH ASSEMBLY AND METHOD OF INSTALLING THE SAME

(71) Applicant: ASSA ABLOY Americas Residential Inc., New Haven, CT (US)

(72) Inventors: Doo Fai Yip, Rosemead, CA (US); Oscar Romero, Laguna Woods, CA (US); Eric Xin, Xiamen (CN); Elena Gorkovenko, Mission Viejo, CA (US); Cathy Rao, Xiamen (CN)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 167 days.

(21) Appl. No.: 18/606,482

(22) Filed: Mar. 15, 2024

(65) Prior Publication Data

US 2024/0328196 A1 Oct. 3, 2024

Related U.S. Application Data

(60) Provisional application No. 63/455,745, filed on Mar. 30, 2023.

(51) Int. Cl.
*E05B 15/10* (2006.01)
*E05B 9/02* (2006.01)

(52) U.S. Cl.
CPC ................ *E05B 15/10* (2013.01); *E05B 9/02* (2013.01)

(58) Field of Classification Search
CPC . E05B 15/10; E05B 9/02; E05B 13/10; E05B 13/101; Y10T 70/5155; E05C 3/22; E05C 3/14
USPC .............................................................. 70/91
See application file for complete search history.

(56) References Cited

U.S. PATENT DOCUMENTS

| | | | | |
|---|---|---|---|---|
| 4,995,248 A * | 2/1991 | Liu | E05B 47/0692 | 70/277 |
| 5,487,289 A * | 1/1996 | Otto, III | E05C 9/047 | 70/279.1 |
| 7,096,698 B2 * | 8/2006 | Walsh, III | E05B 47/0012 | 70/277 |
| 8,555,685 B2 * | 10/2013 | Frolov | E05B 63/16 | 70/482 |
| 2006/0208509 A1 | 9/2006 | Bodily | | |

(Continued)

FOREIGN PATENT DOCUMENTS

| | | | |
|---|---|---|---|
| EP | 761912 A1 * | 3/1997 | |
| GB | 2314118 A * | 12/1997 | E05B 47/0673 |

(Continued)

OTHER PUBLICATIONS

PCT International Search Report and Written Opinion in Application PCT/US2024/020235, mailed Jul. 5, 2024, 11 pages.

*Primary Examiner* — Suzanne L Barrett
(74) *Attorney, Agent, or Firm* — Merchant & Gould P.C.

(57) ABSTRACT

A latch assembly includes a bolt selectively moveable between an extended position and a retracted position. A cam blocker is included and positionable in different configurations. In one configuration, the cam blocker allows the bolt to move towards the retracted position with actuation of a handle in two different rotational directions. In another configuration, the cam blocker allows the bolt to move towards the retracted position with actuation of the handle in only one rotational direction. The latch assembly is also adjustable between at least two different backset distances.

20 Claims, 10 Drawing Sheets

(56) References Cited

U.S. PATENT DOCUMENTS

| | | | | |
|---|---|---|---|---|
| 2011/0079057 | A1* | 4/2011 | Frolov | E05B 47/0673 70/91 |
| 2013/0234453 | A1 | 9/2013 | Murphy et al. | |
| 2016/0298360 | A1 | 10/2016 | Moon | |
| 2019/0345737 | A1 | 11/2019 | Ramakrishna | |
| 2022/0364391 | A1 | 11/2022 | Kumar et al. | |

FOREIGN PATENT DOCUMENTS

| | | | | | |
|---|---|---|---|---|---|
| JP | 07-043383 | | | 10/1995 | |
| NO | 313761 | B1 | * | 11/2002 | E05B 47/0673 |
| WO | WO-0159241 | A2 | * | 8/2001 | E05C 1/163 |

* cited by examiner

LATCH ASSEMBLY AND METHOD OF INSTALLING THE SAME

CROSS-REFERENCE TO RELATED APPLICATIONS

This application claims the benefit of priority to U.S. Provisional Patent Application No. 63/455,745, filed Mar. 30, 2023, the entire disclosure of which is incorporated herein by reference in its entirety.

BACKGROUND

This disclosure relates generally to latch assemblies and, more particularly, to a latch assembly that is positionable in at least a knob configuration and a lever configuration, and can include an adjustable backset.

At least some known latch assemblies are mounted at least partially inside a door and are configured so that a bolt may selectively extend from the door and into a strike plate on a door jamb to secure or lock the door. In order to install the deadbolt, the door requires an edge bore configured to receive the latch assembly and a cross bore configured to connect the latch assembly with a handle assembly. Some handle assemblies may include a knob handle and at least some knobs rotate in either rotational direction in order to retract the bolt from the strike plate and allow the door to be opened. Other handle assemblies may include a lever handle and at least some levers rotate in a single rotational direction in order to retract the bolt from the strike plate and allow the door to be opened. In addition, latch assemblies need to fit a backset of the door, which is a distance between an edge of the door to a center of the cross bore. Typical backset dimensions are 2⅜ inches and 2¾ inches. Improvements to latch assemblies are desired so that different handle assemblies can be accommodated and so that adjustable backset distances can be provided.

SUMMARY

The present disclosure relates generally to latch assemblies that are selectively configurable for both handle rotation directions and backset distances. The latch assembly includes a cam blocker that selectively allows or restricts rotation direction of a cam that drives operation of the latch assembly and which retracts a bolt. Additionally, at least a portion of the bolt is adjustable for different backset positions.

In an aspect, the technology relates to a latch assembly including: a housing having a first end and an opposite second end, the first end and the second end defining a longitudinal axis, the housing also having a first horizontal sidewall and an opposite second horizontal sidewall; a bolt slidably mounted at least partially within the housing at the first end, the bolt selectively moveable between at least an extended position and a retracted position relative to the first end of the housing; a cam rotatably mounted at least partially within the housing proximate the second end, the cam selectively rotatable around a rotation axis, the rotation axis substantially orthogonal to the longitudinal axis and substantially parallel to the first and second horizontal sidewalls of the housing, wherein the cam includes at least one radial projection; a slide arm assembly coupling the bolt with the cam such that rotation of the cam around the rotation axis drives movement of the bolt along the longitudinal axis; and a cam blocker mounted to the housing and configured to selectively engage with the at least one radial projection of the cam, the cam blocker positionable in at least a first position, whereby the cam is freely rotatably in both directions around the rotation axis and towards both the first and second horizontal sidewalls of the housing, and a second position, whereby the cam blocker selectively engages with the at least one radial projection so as to block rotation of the cam around the rotation axis relative to the first horizontal sidewall of the housing.

In an example, the cam blocker is positionable in a third position, in the third position the cam blocker selectively engages with the at least one radial projection so as to block rotation of the cam around the rotation axis relative to the second horizontal sidewall of the housing. In another example, the first position of the cam blocker is located between the second and third positions of the cam blocker. In still another example, the cam blocker includes a pin substantially parallel to the rotation axis and slidably mounted to the housing. In yet another example, the housing defines at least one slot configured to receive at least a portion of the pin, the at least one slot being substantially C-shaped. In an example, the cam blocker further includes a biasing block biasing the pin towards the cam along the longitudinal axis.

In another example, the latch assembly has an adjustable backset between at least two different backset positions. In still another example, a sleeve is rotatably mounted at the first end of the housing, rotation of the sleeve in a first direction around the longitudinal axis extends the sleeve and at least a portion of the bolt relative to the first end of the housing, and rotation of the sleeve in an opposite second direction around the longitudinal axis retracts the sleeve and at least a portion of the bolt relative to the first end of the housing. In yet another example, rotation of the sleeve corresponds to rotation of at least a portion of the bolt around the longitudinal axis. In an example, the bolt includes an oblique surface, the oblique surface facing a first direction when the sleeve and the bolt are extended relative to the first end of the housing and facing an opposite second direction when the sleeve and the bolt are retracted relative to the first end of the housing. In another example, the bolt includes an outer housing and an inner body, the inner body coupled to the slide arm assembly and having a helical groove such that the outer housing is rotatable relative to the inner body.

In another aspect, the technology relates to a latch assembly including: a housing defining a longitudinal axis; a bolt slidably mounted at least partially within the housing and moveable between at least an extended position and a retracted position along the longitudinal axis; a cam rotatably mounted at least partially within the housing, the cam configured to couple to a torque blade rotatable around a rotation axis substantially orthogonal to the longitudinal axis; a slide arm assembly coupling the bolt with the cam such that rotation of the torque blade drives movement of the bolt; a sleeve rotatably mounted to the housing proximate the bolt, wherein a rotation position of the sleeve relative to the housing defines a backset position of the latch assembly; and a cam blocker selectively engageable with the cam and positionable between at least a knob configuration and a lever configuration, wherein when in the knob configuration, the cam is rotatable in both directions around the rotation axis to drive actuation of the slide arm assembly and movement of the bolt towards the retracted position, and wherein when in the lever configuration, the cam is rotatable in only a single direction around the rotation axis to drive actuation of the slide arm assembly and movement of the bolt towards the retracted position.

In an example, the cam blocker includes a pin slidable on a C-shaped slot defined in the housing, the pin biased by a biasing block along the longitudinal axis, the lever configuration defined by the pin positioned at one of the ends of the C-shaped slot and the knob configuration defined by the pin centered within the C-shaped slot. In another example, the lever configuration includes a first lever configuration having the pin positioned at a first end of the C-shaped slot and preventing rotation of the cam in a first direction around the rotation axis and a second lever configuration having the pin positioned at a second end of the C-shaped slot and preventing rotation of the cam in an opposite second direction around the rotation axis. In still another example, the bolt includes an outer housing and an inner body, the outer housing rotatable relative to the inner body, the inner body coupled to the slide arm assembly, and rotation of the sleeve relative to the housing rotates the outer housing relative to the inner body. In yet another example, rotation of the outer housing relative to the inner body moves the outer housing relative to the inner body along the longitudinal axis.

In another aspect, the technology relates to a method of installing a latch assembly on a door, the method including: providing the latch assembly that includes a housing, a sleeve coupled to a face plate at a first end of the housing, a bolt extendable and retractable relative to the first end of the housing and having an oblique surface, a cam rotatably mounted to the housing and defining a rotation axis, a slide arm assembly coupling the cam to the bolt, and a cam blocker; configuring the latch assembly to a first backset position, wherein the first backset position is defined by rotating the sleeve relative to the first end of the housing; orienting the latch assembly relative to a swing orientation of the door; and setting the cam blocker to one of a knob configuration and a lever configuration, wherein when in the knob configuration, the cam is rotatable in both directions around the rotation axis to drive actuation of the slide arm assembly and retraction movement of the bolt, and wherein when in the lever configuration, the cam is rotatable in only a single direction around the rotation axis to drive actuation of the slide arm assembly and retraction movement of the bolt.

In an example, rotating the sleeve relative to the first end of the housing further includes rotating the oblique surface of the bolt relative the first end of the housing. In another example, orienting the latch assembly relative to the swing orientation of the door includes positioning the oblique surface relative to a keeper mounted on a door jamb. In still another example, setting the cam blocker to one of the knob configuration and the lever configuration includes sliding a pin within a C-shaped slot defined within the housing, the pin coupled to a biasing block.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular examples of the present disclosure and therefore do not limit the scope of the present disclosure. The drawings are not to scale and are intended for use in conjunction with the explanations in the following detailed description. Examples of the present disclosure will hereinafter be described in conjunction with the appended drawings, wherein like numerals denote like elements.

DETAILED DESCRIPTION

Figure 1:
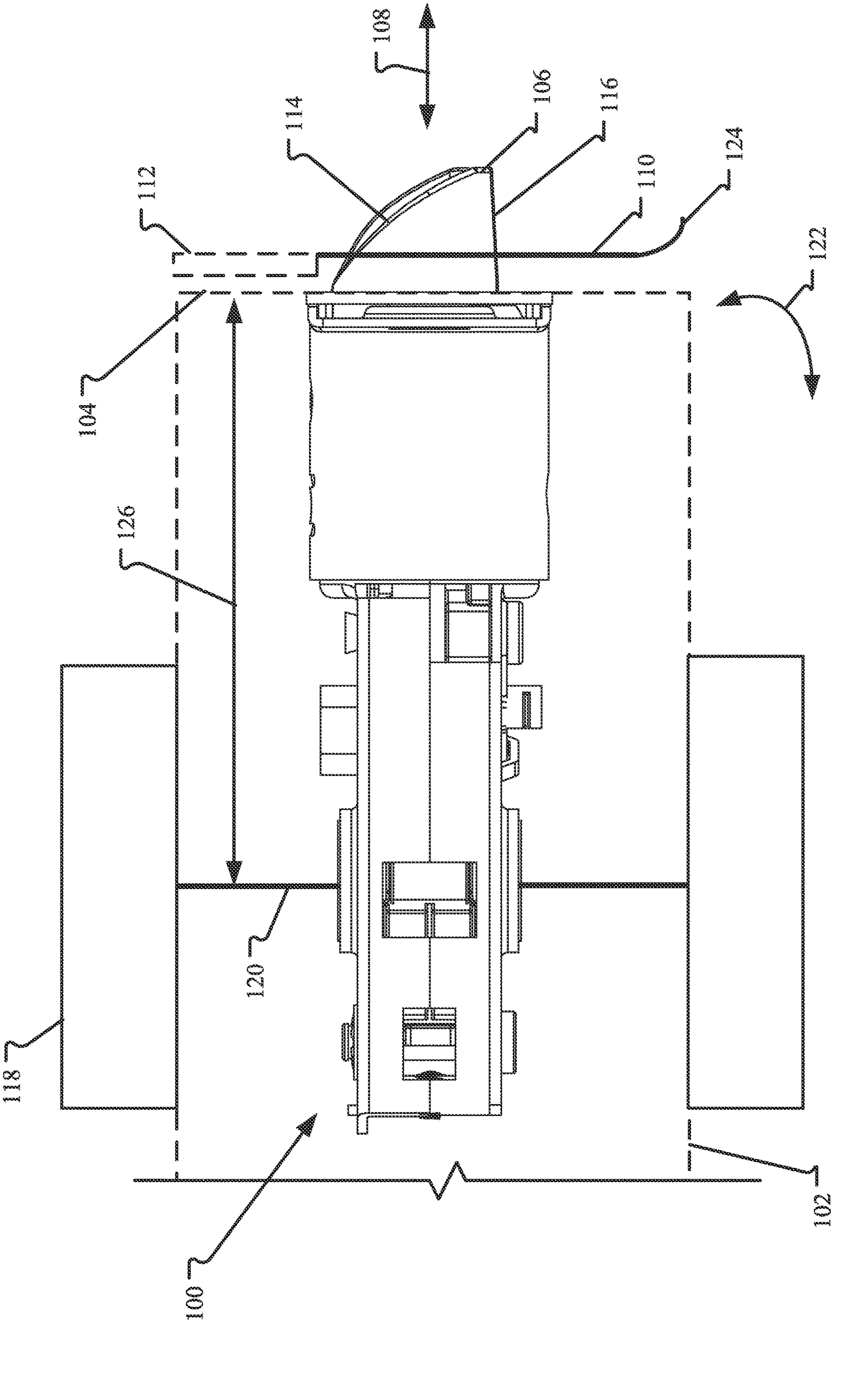
FIG. 1 is plan view of an exemplary latch assembly mounted within a door and in accordance with the principles of the present disclosure.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible embodiments for the appended claims.

Latch assemblies are typically mounted within a door and need to be configurable for different swing orientations and backset distances. Additionally, latch assemblies need to be useable with different actuation (e.g., handle) assemblies. For example, some handles are knob-type handle configurations, whereby knob rotation in both directions is required or desired, and other handles are lever-type handle configurations, whereby lever rotation in only a single direction is required or desired.

The latch assembly described herein include a cam that is rotatably driven by the handle assembly so as to retract a bolt from the latch assembly. The latch assembly includes a cam blocker that can be selectively positioned so that full rotation of the cam is enabled or restricted rotation of the cam is enabled. This allows for the latch assembly to be used for different handle types. The cam blocker is accessible from the exterior of the latch assembly and so that the installer may easily configure the latch assembly on-site or in the field.

Additionally, the latch assembly may change backset distances by rotating a front sleeve relative to a housing. The front sleeve also at least partially rotates the bolt so that an oblique surface, which is configured to automatically engage a keeper when the door is being closed, is enabled for different backset distances. The front sleeve is also accessible from the exterior of the latch assembly and so that the installer may also easily set the backset distance of the latch assembly.

FIG. 1 is plan view of an exemplary latch assembly 100 mounted within a door 102. The latch assembly 100 is configured to be mounted at an edge 104 with a bolt 106 extending therefrom. The bolt 106 is configured to be selective movable 108 between at least an extended position (as illustrated in FIG. 1) and a retracted position. When the door 102 is in a closed position (as illustrated in FIG. 1), the bolt 106 at least partially extends within and engages with a strike plate 110 mounted on a door jamb 112. The bolt 106 includes an oblique or curved surface 114 and a planar surface 116. The planar surface 116 restricts or prevents the door 102 from opening without first moving the bolt 106 towards the retracted position. The latch assembly 100 can be coupled to a handle assembly 118 via a torque blade or drive shaft 120 so as to drive operation of the bolt 106. The handle assembly 118, may include handles on one or both sides of the door 102 that are configured to rotate the torque blade 120 and retract the bolt 106. Generally, the latch assembly 100 and the handle assembly 118 may be referred to as a lock assembly or lockset assembly. The term "lock" or "lockset" is broadly intended to include any type of lock, including, but not limited to, deadbolts, knob locks, lever handle locks, mortise locks, and slide locks, whether mechanical, electrical, or electro-mechanical locks. The locking points may have various mounting configurations and/or locations, including, but not limited to: mortised within the doorframe (as described herein), mounted externally to the doorframe or support structure, and/or affixed directly to the door.

In examples, the handle(s) of the handle assembly 118 may include knobs or knob-type handles that are required or desired to be rotatable in both directions so as to move the bolt 106 towards the retracted position. In other examples, the handle(s) of the handle assembly 118 may include levers or lever-type handles that are required or desired to be rotatable in a single direction (e.g., only in a downwards direction or only in an upwards direction) so as to move the bolt 106 towards the retracted position. The latch assembly 100 is configured to operate in at least a knob configuration and a latch configuration and so that different handle assemblies do not require different latch assemblies.

Once the door 102 is opened and the door 102 is to be closed, the door 102 swings 122 towards the door jamb 112 and the oblique surface 114 of the bolt 106 contacts a lip 124 of the strike plate 110. The contact between the bolt 106 and the strike plate 110 automatically retracts the bolt 106 so that the door 102 can close, and the bolt 106 is biased so as to automatically extend once within the strike box of the strike plate 110. Because the bolt 106 is not symmetrical about its vertical axis, the latch assembly 100 is configured to mounted on the door 102 at any swing orientation of the door 102 while still being able to operate in at least two different configurations (e.g., the knob and latch configurations). Additionally, the latch assembly 100 has an adjustable backset distance 126 and so that the latch assembly 100 is operable for at least two different backset distances. The backset distance 126 can be measured from the edge 104 of the door 102 and a center line of the torque blade 120.

Figure 3:
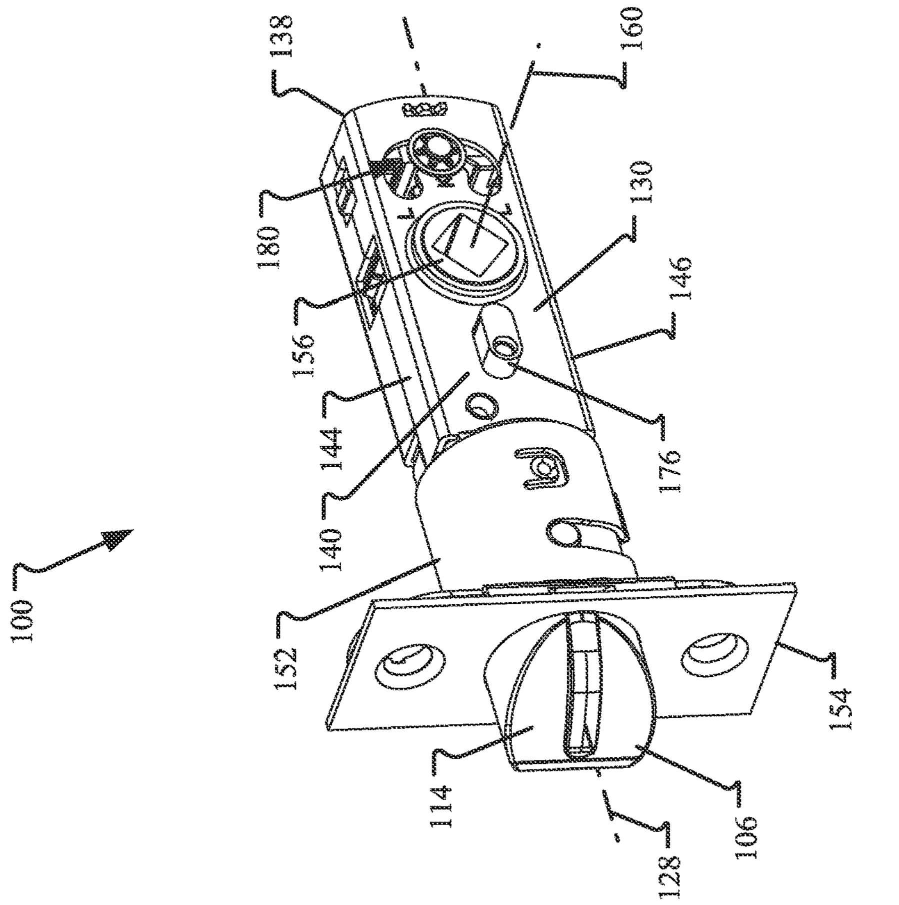
FIGS. 2 and 3 are perspective views of the latch assembly shown in FIG. 1.
Figure 2:
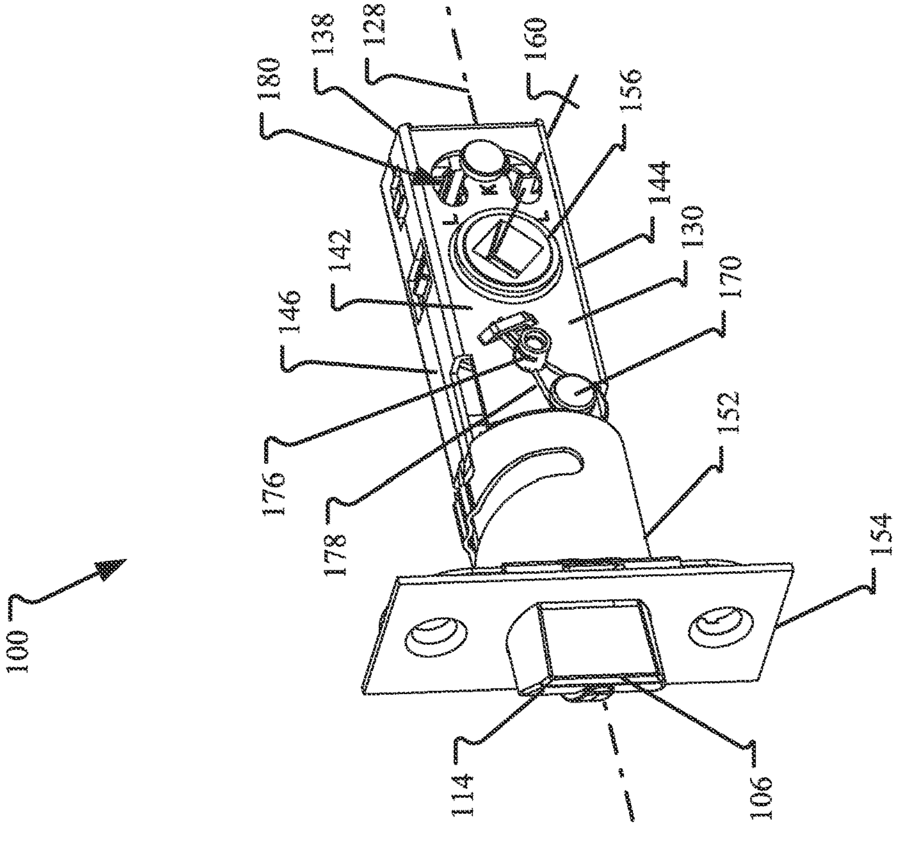
Figure 4:
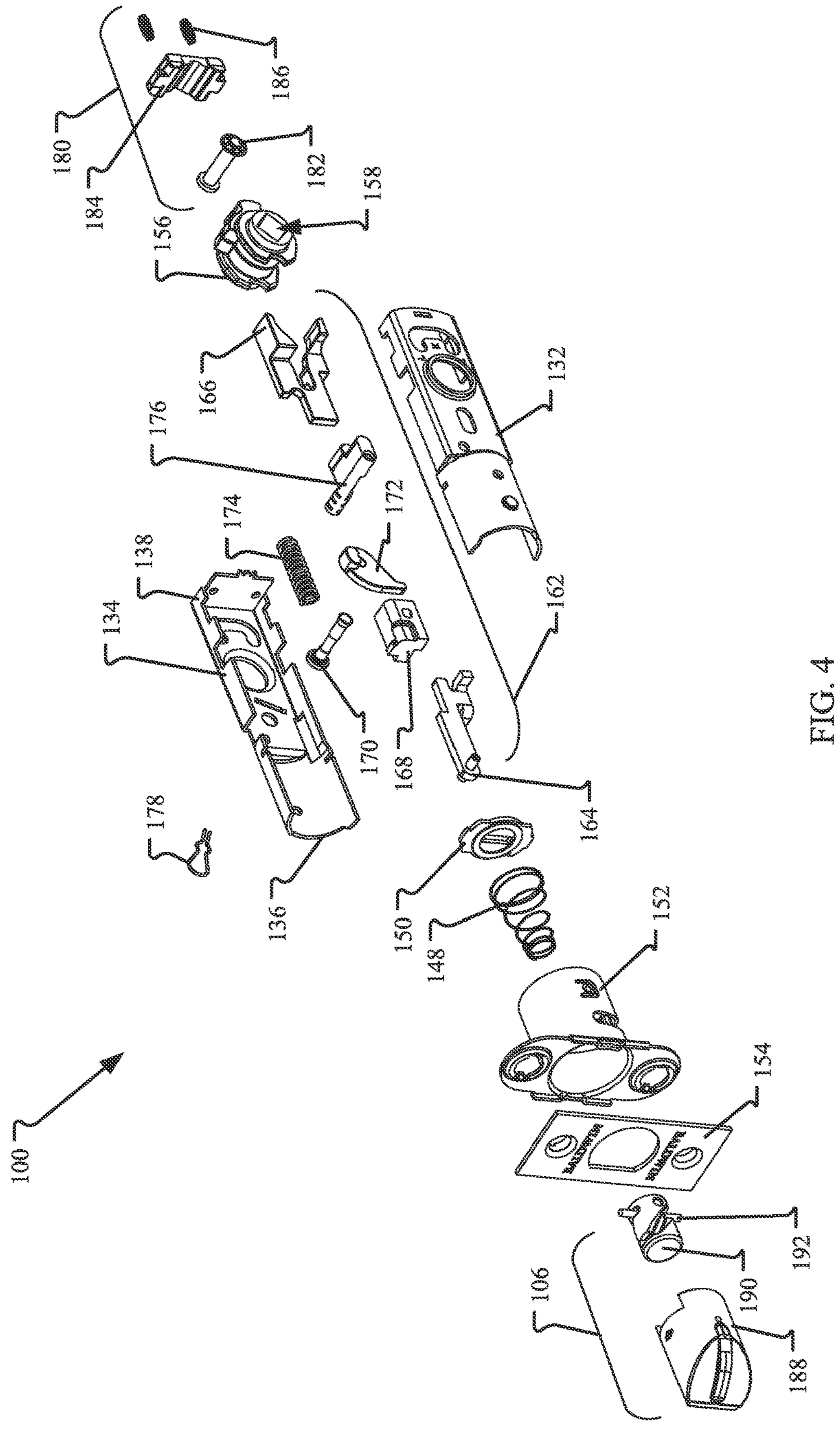
FIG. 4 is an exploded, perspective view of the latch assembly shown in FIG. 1.

FIGS. 2 and 3 are perspective views of the latch assembly 100, FIGS. 2 and 3 show opposite sides of the latch assembly 100 and with the latch assembly 100 rotated 180° about a longitudinal axis 128. By being able to rotate the latch assembly 100 180° while maintaining operation thereof, different door swing orientations are facilitated. FIG. 4 is an exploded, perspective view of the latch assembly 100. Referring concurrently to FIGS. 2-4, the latch assembly 100 includes a housing 130 that may have a first body 132 and a second body 134. The housing 130 has a first end 136 and a second end 138 that extends along the longitudinal axis 128. The housing 130 has a first vertical sidewall 140 defined by the first body 132 and an opposite second vertical sidewall 142 defined by the second body 134. A first horizontal sidewall 144 and an opposite second horizontal sidewall 146 are defined by portions of both the first body 132 and the second body 134. The first and second horizontal sidewalls 144, 146 and the first and second vertical sidewalls 140, 142 are substantially parallel with the longitudinal axis 128.

The bolt 106 is slidably mounted at least partially within the housing 130 at the first end 136. The bolt 106 is selectively moveable between at least an extended position (shown in FIGS. 2 and 3) and a retracted position along the longitudinal axis 128 and relative to the first end 136 of the housing 130. The bolt 106 is biased towards the extended position via a biasing member 148 (e.g., compression spring) that is supported along the longitudinal axis 128 by a spring plate 150 disposed within the housing 130.

A sleeve 152 is rotatably mounted to the housing 130 at the first end 136. The sleeve 152 is selectively rotatable around the longitudinal axis 128 so as to define the backset distance 126 (shown in FIG. 1) of the latch assembly 100. The sleeve 152 couples to a face plate 154 that is configured to mount to the edge 104 of the door 102 (both shown in FIG. 1).

A cam 156 is rotatably mounted at least partially within the housing 130 proximate the second end 138. The cam 156 includes an opening 158 that is configured to receive the torque blade 120 (shown in FIG. 1) and be selectively rotatable around a rotation axis 160. The rotation axis 160 is substantially orthogonal to the longitudinal axis 128 and the first and second vertical sidewalls 140, 142. The rotation axis 160 is substantially parallel to the first and second horizontal sidewalls 144, 146 of the housing 130.

A slide arm assembly 162 operationally couples the cam 156 with the bolt 106 and such that rotation of the cam 156 drives retraction of the bolt 106 along the longitudinal axis 128. The slide arm assembly 162 includes a bolt arm 164 coupled to the bolt 106 and a cam arm 166 engaged with the cam 156. The slide arm assembly 162 also includes a fixed support 168 coupled within the housing 130 via a pin 170 and a rotatable member 172 rotatably coupled to the pin 170 and disposed between the bolt arm 164 and the cam arm 166. The cam arm 166 is biased in a direction towards the cam 156 along the longitudinal axis 128 via a biasing member 174 (e.g., a compression spring).

A lock slider 176 is slidably mounted at least partially within the housing 130 and extends parallel to the rotation axis 160. The lock slider 176 is secured on the housing 130 by a spring clip 178 that allows transverse movement of the lock slider 176. In an unlocked position (illustrated in FIGS. 2 and 3), the lock slider 176 allows rotation of the cam 156 such that the bolt 106 can be moved towards the retracted position. The lock slider 176 is movable towards a locked position, whereby the lock slider 176 engages with the cam 156 so that rotation of the cam 156 is restricted or prevented and the bolt 106 is not able to move towards the retracted position. Access to the lock slider 176 may be provided on the handle assembly 118 (shown in FIG. 1).

The latch assembly 100 also includes a cam blocker 180 mounted to the housing 130 and configured to selectively engage with the cam 156. The cam blocker 180 can include a pin 182 slidably mounted on the housing 130 and a biasing block 184 having at least one biasing member 186 (e.g., a compression spring) that biases the position of the pin 182 relative to the cam 156. The cam blocker 180 is configured to be positionable in at least a knob configuration with a "K" indicia on the housing 130 (as illustrated in FIGS. 2 and 3), a first latch configuration with a "L" indicia, and a second latch configuration with a "L" indicia.

The knob configuration of the cam blocker 180 allows the cam 156 to rotate around the rotation axis 160 in both rotational directions so as to drive actuation of the slide arm assembly 162 and movement of the bolt 106 towards a retracted position. The first latch configuration of the cam blocker 180 allows the cam 156 to rotate around the rotation axis 160 in only one rotational direction so as to drive actuation of the slide arm assembly 162 and movement of the bolt 106 towards a retracted position. For example, the "L" proximate the first horizontal sidewall 144 corresponds to a position of the pin 182 that only allows the cam 156 to rotate in a direction towards the second horizontal sidewall 146. The second latch configuration of the cam blocker 180 similarly allows the cam 156 to rotate around the rotation axis 160 in only one rotational direction so as to drive actuation of the slide arm assembly 162 and movement of the bolt 106 towards a retracted position. For example, the "L" proximate the second horizontal sidewall 146 corresponds to a position of the pin 182 that only allows the cam 156 to rotate in a direction towards the first horizontal sidewall 144.

By having two different latch configuration positions of the pin 182, the cam blocker 180 facilitates operation of the latch assembly 100 in both of the orientations of the latch assembly 100 as illustrated in FIGS. 2 and 3 and enables the oblique surface 114 of the bolt 106 to be positioned for the swing orientation of the door 102 and by merely rotating the latch assembly 100 180° around the longitudinal axis 128. In other examples, the bolt 106 may be symmetrical around its vertical axis and have two planar surfaces, the cam blocker 180 may still be used and allow for the handle to rotate in a desired or required rotational direction.

In the example, the bolt 106 includes an outer housing 188 and an inner body 190 engaged with each other via one or more pins 192. The inner body 190 couples to the bolt arm 164. The bolt 106 is described in further detail below.

Figure 5:
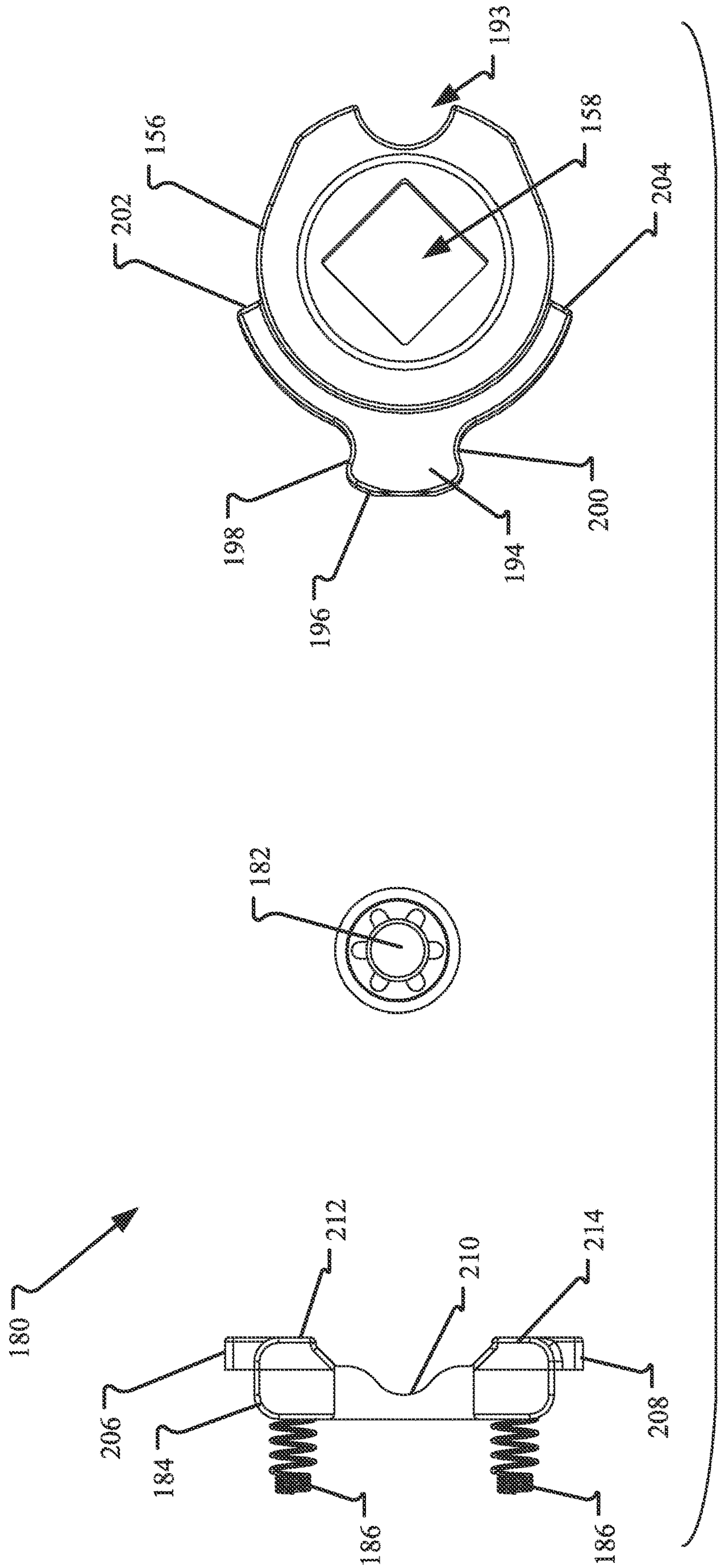
FIG. 5 is side view of a cam blocker and a cam of the latch assembly shown in FIG. 1.

FIG. 5 is side view of the cam blocker 180 and the cam 156. The cam 156 includes the opening 158 that is shaped and sized to receive the torque blade 120 (shown in FIG. 1) and which drives rotational movement of the cam 156. The cam 156 includes a radial recess 193 that is configured to selectively engage with the lock slider 176 (shown in FIG. 4) that when engaged, restricts or prevents the cam 156 from being rotated. The cam 156 also includes a radial projection 194 that opposes the radial recess 193. The radial projection 194 includes a circumferential surface portion 196 and opposite first and second radial surface portions 198, 200.

When the pin 182 is positioned in the knob configuration, the pin 182 faces the circumferential surface portion 196 of the radial projection 194, however, the position of the pin 182 allows the radial projection 194 to rotate past when the cam 156 is being rotated in either direction around the rotation axis 160 (shown in FIGS. 2 and 3). In an aspect, at least a portion of the circumferential surface portion 196 is at least partially planar. When the pin 182 is positioned in the lever configurations, the pin 182 is positioned within the rotation direction of one of the first and second radial surface portions 198, 200 so that the cam 156 is restricted or prevented from rotating through the pin 182. As such, the first and second radial surface portions 198, 200 are configured to selectively engage with the pin 182.

The cam 156 also includes first and second engagement surfaces 202, 204 that extend radially. The first and second engagement surfaces 202, 204 are configured to selectively engage with the cam arm 166 of the slide arm assembly 162 (both shown in FIG. 4) such that upon rotation of the cam 156, the cam arm 166 slides longitudinally within the housing 130 and retracts the bolt 106 (both shown in FIGS. 2 and 3). In the example, the first and second engagement surfaces 202, 204 may be formed at least partially on the radial projection 194.

The cam blocker 180 includes the pin 182 that is a cylindrical shaft that slidably mounts to the housing 130 so as to position the cam blocker 180 between the knob configuration and the lever configuration. The pin 182 can include a head on one end and a clip on the other end so that the pin 182 is slidably retained on the housing 130. The cam blocker 180 also includes the biasing block 184 having biasing members 186. The biasing members 186 bias the pin 182 towards the cam 156 along the longitudinal axis 128 (shown in FIGS. 2 and 3). The biasing block 184 includes upper and lower tabs 206, 208 that sliding engage with the housing 130 so as to retain the cam blocker 180 therein. Opposite of the biasing members 186, the biasing block 184 includes a center recess 210 configured to retain the pin 182 against the housing 130 when in the knob configuration. The biasing block 184 also includes upper and lower positioning surfaces 212, 214 configured to retain the pin 182 against the housing 130 when in the lever configurations. The center recess 210 being offset from the upper and lower positioning surfaces 212, 214 and the biasing block 184 is symmetrical about the longitudinal axis 128.

Figure 6:
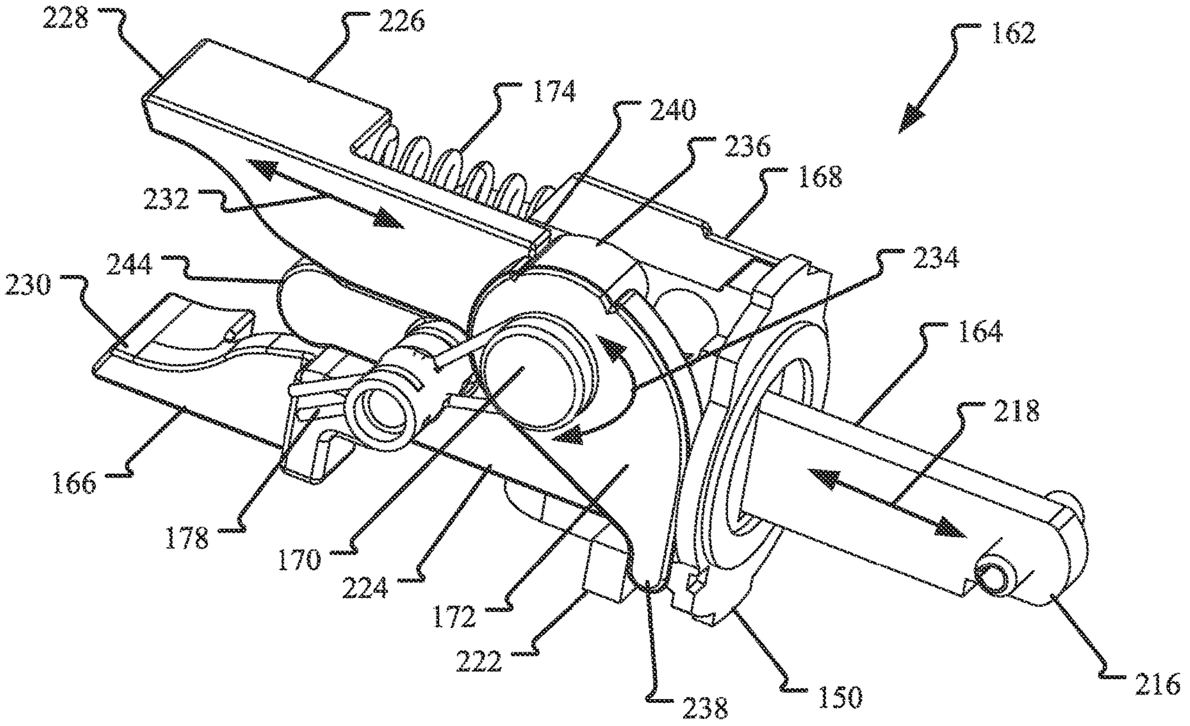
FIGS. 6 and 7 are perspective views of a slide arm assembly of the latch assembly shown in FIG. 1.
Figure 7:
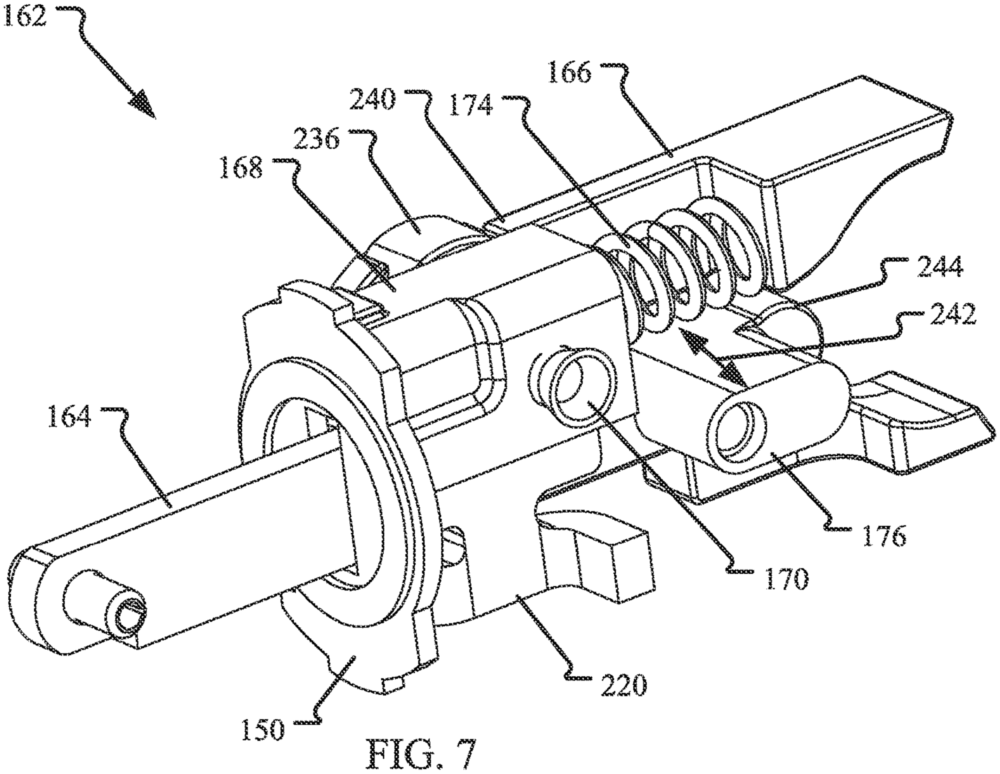

FIGS. 6 and 7 are perspective views of the slide arm assembly 162. Referring concurrently to FIGS. 6 and 7, the slide arm assembly 162 includes the fixed support 168 that is fixedly mounted within the housing 130 (shown in FIGS. 2 and 3) by a pin 170. The fixed support 168 is positioned against the spring plate 150 that is also fixedly mounted within the housing 130. The bolt arm 164 has a first end 216 that extends through a slot within the spring plate 150. The first end 216 of the bolt arm 164 is configured to couple to the bolt 106 (shown in FIG. 4) and slide longitudinally 218 so as to retract the bolt 106. As illustrated in FIGS. 6 and 7, the bolt arm 164 is in its extended position which corresponds to the bolt 106 being extended. The bolt arm 164 has an opposite second end 220 disposed on the opposite side of the spring plate 150. The second end 220 of the bolt arm 164 includes at least one leg 222 extending therefrom. In an aspect, the leg 222 is disposed at least partially below the fixed support 168.

The slide arm assembly 162 also includes the cam arm 166. The cam arm 166 has a first end 224 that overlaps with the bolt arm 164 and an opposite second end 226 that is configured to engage with the cam 156 (shown in FIG. 5). The second end 226 of the cam arm 166 includes upper and lower projections 228, 230 that engage with the first and second engagement surfaces 202, 204 (shown in FIG. 5) of the cam 156. Accordingly, when the cam 156 rotates, one of the upper and lower projections 228, 230 are engaged and the cam arm 166 slides longitudinally 232. The cam arm 166 is biased in a direction towards the second end 226 and the cam 156 with the biasing member 174. The biasing member 174 is disposed between the cam arm 166 and the fixed support 168.

In operation, when the cam 156 rotates to retract the bolt 106, the cam arm 166 slides forward and towards the spring plate 150, however, the bolt arm 164 is driven rearward and in an opposite direction so as to drive retraction of the bolt 106. The rotatable member 172 is coupled between the cam arm 166 and the bolt arm 164 so as to drive this movement. The rotatable member 172 is mounted to the pin 170 so that it is rotatable 234 there around. The rotatable member 172 includes a flange 236 projecting from one side and a finger 238 extending from at the opposite end of the rotatable member 172. The flange 236 engages with a shoulder 240 of the cam arm 166 such that as the cam arm 166 moves forward, the rotatable member 172 rotates with the finger 238 moving rearward and towards the cam 156. The finger 238 is engaged with the leg 222 of the bolt arm 164 so that the bolt arm 164 is driven rearward and drive retraction of the bolt 106 coupled thereto. Once the bolt 106 is retracted, the biasing member 174 is configured to automatically extend the bolt 106 and move the cam arm 166, the rotatable member 172, and bolt arm 164 in a reverse direction.

The lock slider 176 is configured to move in a transverse direction 242 such that the lock slider 176 can be moved into a position whereby a rearward stop projection 244 is within the radial recess 193 (shown in FIG. 5) of the cam 156 and the cam 156 is restricted or prevented from rotating. At least a portion of the lock slider 176 may be coupled to the pin 170 by the spring clip 178 and to retain the lock slider 176 within the housing 130. The lock slider 176 extends at least partially through the cam arm 166 but does not slide longitudinally therewith.

Figure 8:
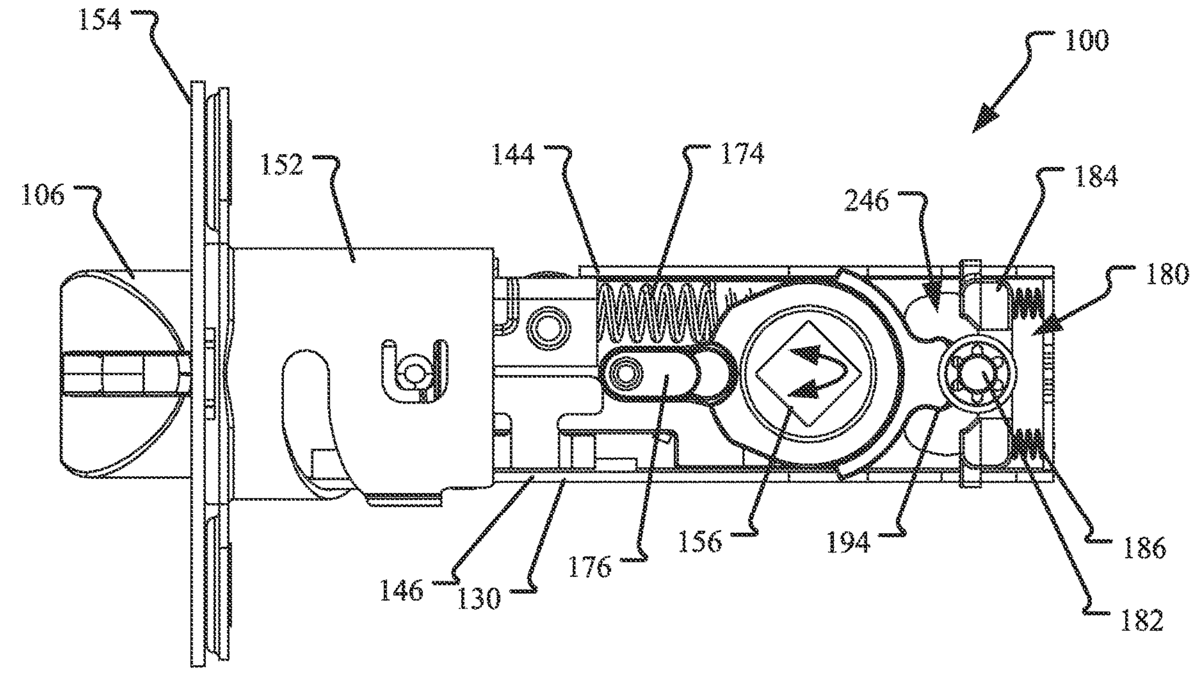
FIG. 8 is a side view of the latch assembly shown in FIG. 1 in a knob configuration.

FIG. 8 is a side view of the latch assembly 100 in a knob configuration. The housing 130 is illustrated as being transparent so that the components underneath are shown. Each vertical sidewall 140, 142 of the housing 130 includes a slot 246 that slidable receives the pin 182 of the cam blocker 180. The slot 246 is substantially C-shaped and the knob configuration has the pin 182 positioned at the center of the slot 246. This configuration allows for the radial projection 194 of the cam 156 to be clear of the pin 182 and the cam 156 to be rotatable in both directions as required or desired and to retract the bolt 106. For example, the radial projection 194 can rotate in a direction towards either the first and second horizontal sidewalls 144, 146. In an aspect, the knob configuration is configured to use with knobs utilized as handles within the handle assembly 118 (shown in FIG. 1). The biasing block 184 captures the pin 182 within the center recess 210 (shown in FIG. 5) and urges the pin 182 against the housing 130 so as to maintain the position of the cam blocker 180. In an aspect, the pin 182 in the knob configuration is disposed between the pin position in the two lever configurations within the slot 246.

Figure 9:
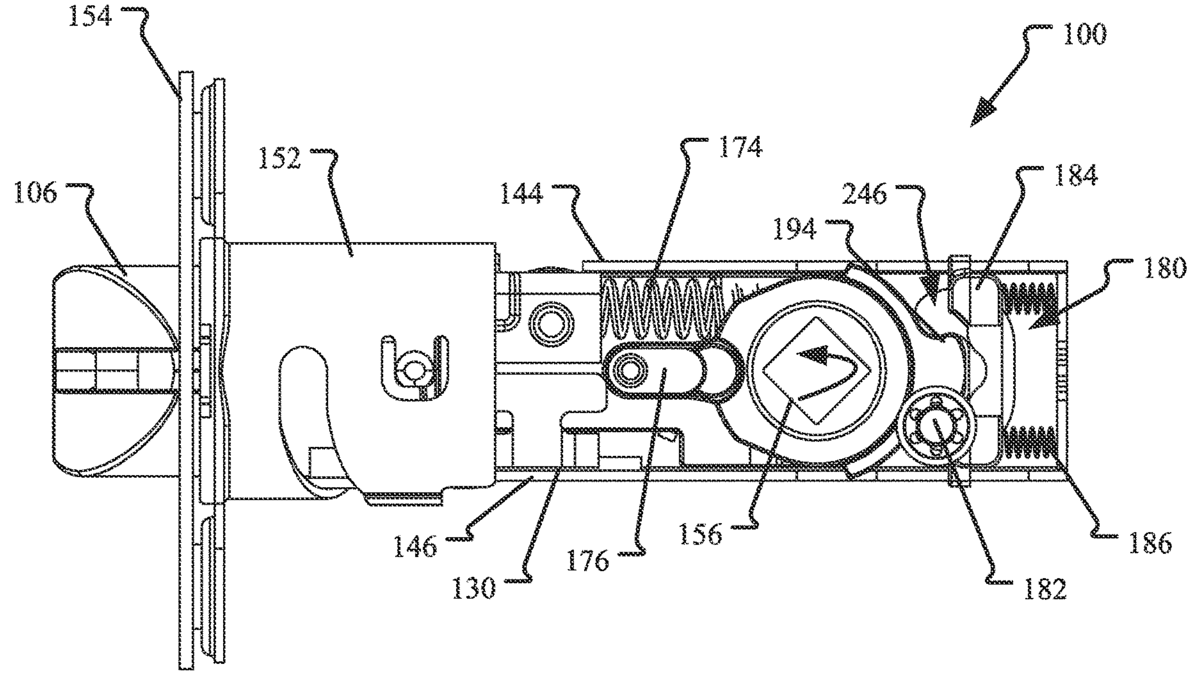
FIG. 9 is a side view of the latch assembly shown in FIG. 1 in a lever configuration.

FIG. 9 is a side view of the latch assembly 100 in a lever configuration. The housing 130 is illustrated as being transparent so that the components underneath are shown. In the lever configuration, the pin 182 is positioned at one of the ends of the slot 246 and the pin 182 is held in the position by the biasing block 184 urging the pin 182 into the housing 130. The biasing block 184 engages the pin 182 with the lower positioning surface 214 (shown in FIG. 5). In the lever configuration, the pin 182 is within the rotation pathway of the radial projection 194 of the cam 156. This forces the cam 156 to be rotatable in only one direction to drive retraction of the bolt 106. For example, the radial projection 194 can only rotate towards the first horizontal sidewall 144 to move the bolt 106. As illustrated, the rotation direction to retract the bolt 106 is in the counter-clockwise direction. In an aspect, the lever configuration is configured to use with levers utilized as handles within the handle assembly 118 (shown in FIG. 1).

While only one lever configuration is illustrated in FIG. 9, it is appreciated that the pin 182 can be alternatively be positioned at the other end of the slot 246 and which forces the cam 156 to be rotatable in the clockwise direction to drive retraction of the bolt 106. As such, the radial projection 194 can only rotate towards the second horizontal sidewall 146 to move the bolt 106. By having two lever configurations, the bolt 106 with its oblique surface can be mounted on either the left or right door edge and any swing orientation as required or desired. A user can slide the pin 182 between different configurations manually as required or desired and during the installation process of the latch assembly 100.

In addition to the latch assembly 100 having the cam blocker 180 that selectively restricts rotation of the cam 156 and so as to accommodate different handle configurations, the latch assembly 100 also has an adjustable backset configuration so that the latch assembly 100 is adjustable between at least to different backset distances. It is appreciated, that the adjustable backset features and components may be used in conjunction with the cam blocker 180, however, the adjustable backset features and component may alternatively be used separately and independently from the cam blocker 180.

Figure 10:
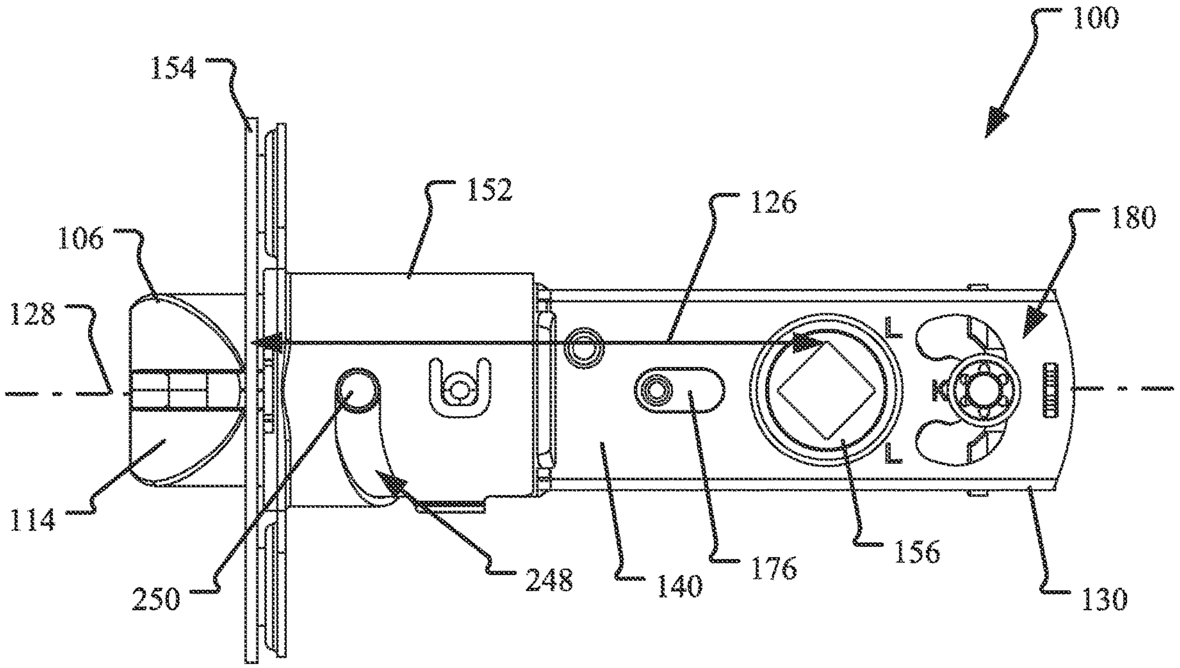
FIG. 10 is a side view of the latch assembly shown in FIG. 1 in a first backset position.
Figure 11:
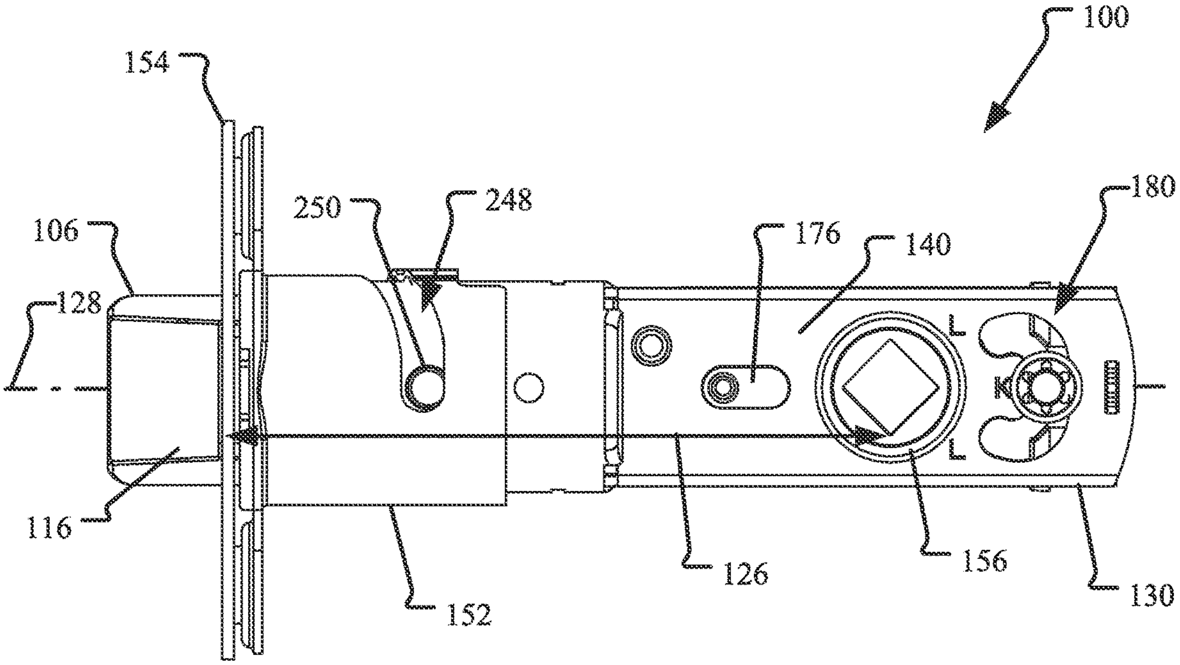
FIG. 11 is a side view of the latch assembly shown in FIG. 1 in a second backset position.

FIG. 10 is a side view of the latch assembly 100 in a first backset position. FIG. 11 is a side view of the latch assembly 100 in a second backset position. Referring concurrently to FIGS. 10 and 11 and as described above, the backset distance 126 is defined from the face plate 154 to the rotation axis of the cam 156 and having an adjustable backset distance 126 allows the latch assembly 100 to be used in different doors and handle assemblies as required or desired. In the example, FIG. 10 has a backset distance 126 of 2⅜ inches, while FIG. 11 has a backset distance 126 of 2¾ inches.

The sleeve 152 is rotationally mounted to the housing 130 and is rotatable around the longitudinal axis 128. The sleeve 152 has a helical groove 248 and the housing 130 includes a boss 250 slidably received at least partially within the helical groove 248. As such, rotation of the sleeve 152 extends the sleeve 152 and the face plate 154 relative to the housing 130 so as to adjust the backset distance 126. In the example, a rotation of the sleeve 152 about 180° around the longitudinal axis 128 changes the backset distance 126 between 2⅜ inches and 2¾ inches. Rotation of the sleeve 152 also extends at least a portion of the bolt 106 relative to the housing 130 and so that operation of the bolt 106 is maintained.

The sleeve 152 is engaged with the bolt 106 so that during rotation of the sleeve 152 relative to the housing 130, the bolt 106 also rotates around the longitudinal axis 128 and in addition to the extending/retracting movement. However, the bolt 106 is not symmetrical along a vertical direction and includes the oblique surface 114 and the planar surface 116. As such, the bolt 106 is configured to at least partially allow for rotation of the oblique surface 114 while the slide arm assembly 162 (shown in FIGS. 6 and 7) that drives movement of the bolt 106 does not rotate. This facilitates the oblique surface 114 being aligned with the first vertical sidewall 140 of the housing 130 in FIG. 10, while the planar surface 116 is aligned with the first vertical sidewall 140 in FIG. 11. Additionally, the cam blocker 180 has two different lever configurations as described above so that even with the change in orientation of the bolt 106 the rotation of the cam 156 can be set as required or desired.

Figure 12:
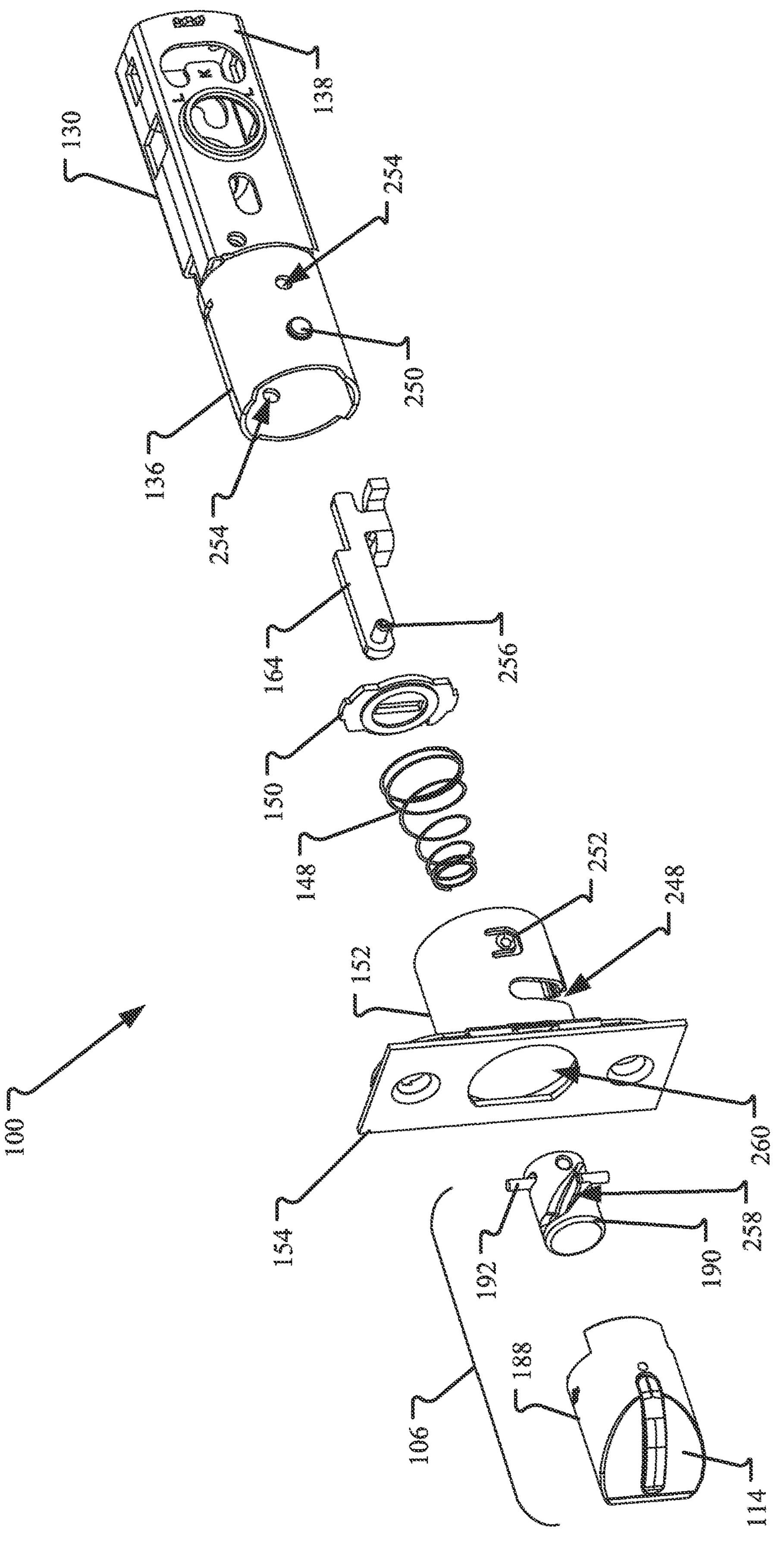
FIG. 12 is a partial, exploded, perspective view of the latch assembly shown in FIG. 1.
Figure 13:
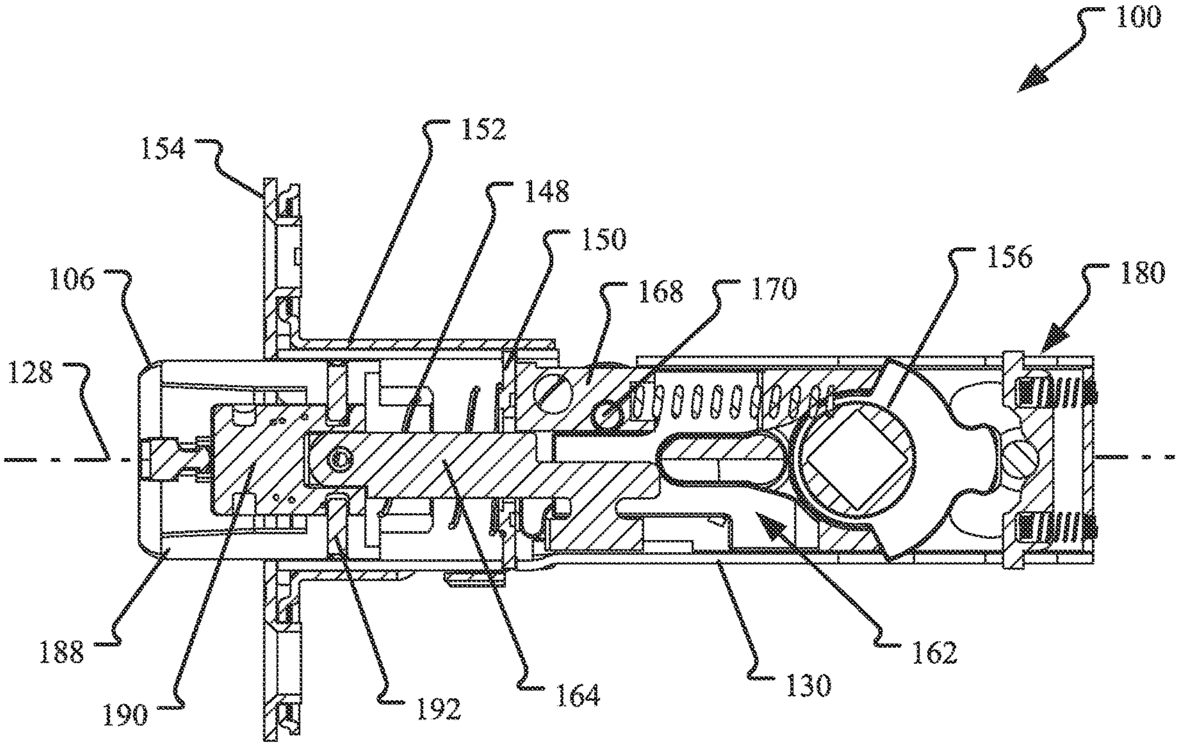
FIG. 13 is a cross-sectional view of the latch assembly shown in FIG. 1 in the first backset position corresponding to FIG. 10.
Figure 14:
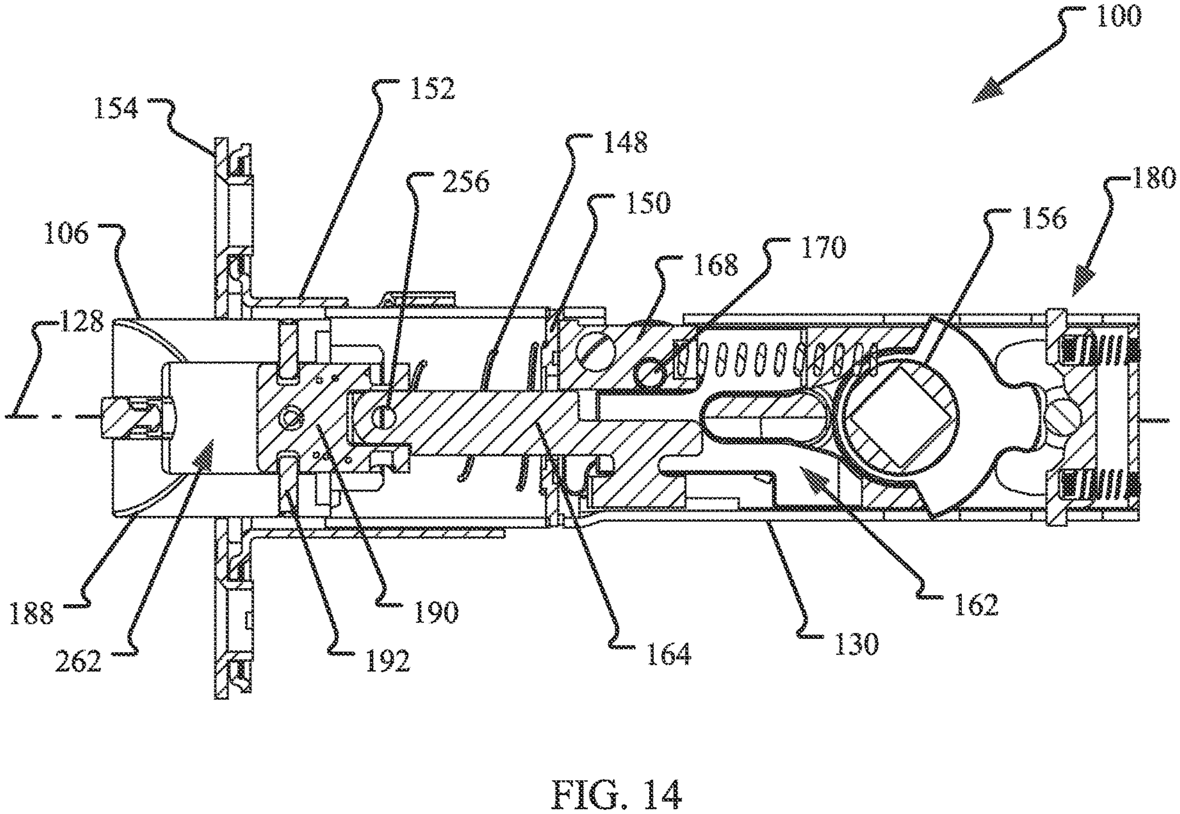
FIG. 14 is a cross-sectional view of the latch assembly shown in FIG. 1 in the second backset position corresponding to FIG. 11.

FIG. 12 is a partial, exploded, perspective view of the latch assembly 100. FIG. 13 is a cross-sectional view of the latch assembly 100 in the first backset position corresponding to FIG. 10. FIG. 14 is a cross-sectional view of the latch assembly 100 in the second backset position corresponding to FIG. 11. In FIG. 12 portions of the slide arm assembly 162 (shown in FIGS. 6 and 7) and the cam blocker 180 and cam 156 (both shown in FIG. 5) are not illustrated for clarity. Referring concurrently to FIGS. 12-14, the structure of the bolt 106 and the sleeve 152 that enables the latch assembly 100 to have an adjustable backset configuration is described. The sleeve 152 is coupled to the first end 136 of the housing 130 with the boss 250 received within the helical groove 248. In the example, the first end 136 of the housing 130 is substantially cylindrical in shape and different than the substantially rectangular shape of the second end 138. In some examples, the sleeve 152 includes a detent 252 that is configured to engage with corresponding apertures 254 in both backset configurations and so as to facilitate positioning of the sleeve 152 relative to the housing 130.

The bolt arm 164, the spring plate 150, and the biasing member 148 are disposed within the housing 130. The bolt arm 164 slides within the housing 130 along the longitudinal axis 128 so as to extend and retract the bolt 106, while the spring plate 150 is fixed within the housing 130. FIGS. 13 and 14 both illustrate the bolt 106 in its extended position relative to the face plate 154 that couples to the sleeve 152. The bolt 106 is biased towards the extended position via the biasing member 148. When the latch assembly 100 is in the longer backset position as illustrated in FIG. 14, not only does the sleeve 152 extend relative to the housing 130, but at least a portion of the bolt 106 extends relative to the housing 130 so as to maintain operation of the latch assembly 100. The bolt arm 164 does not move within the housing 130, so as such, at least a portion of the bolt 106 is configured to extend relative to the housing 130 upon rotation of the sleeve 152.

In the example, the bolt 106 is a two-piece component with the outer housing 188 and the inner body 190 slidable and rotatably engaged with each other via one or more pins 192. The inner body 190 is coupled to the bolt arm 164 with a pin 256. As such, longitudinal movement of the bolt arm 164 drives corresponding longitudinal movement of the inner body 190 to extend and retract the outer housing 188 that includes the oblique surface 114 and the planar surface 116 (shown in FIG. 1). The inner body 190 is not rotatable around the longitudinal axis 128. However, to enable the oblique surface 114 to change the direction it is facing during rotation of the sleeve 152 and face plate 154 during backset adjustment, the outer housing 188 is rotatably and slidably coupled to the inner body 190.

The inner body 190 includes one or more, and as illustrated a pair of helical grooves 258, that the pin 192 engages with. Additionally, the outer perimeter shape of the outer housing 188 corresponds to an opening 260 within the face plate 154 so that as the face plate 154 rotates around the longitudinal axis 128 with the sleeve 152, rotation of the outer housing 188 relative to the inner body 190 also occurs via the pins 192 sliding within the helical grooves 258. As such, the outer housing 188 rotates and slides longitudinally relative to the inner body 190 when in the second backset position as illustrated in FIG. 14 and so that a space 262 is formed within the bolt 106. Even with the outer housing 188 rotated and extend relative to the inner body 190, operation of the latch assembly 100 and driving the bolt 106 to extend and retract remains the same in both backset positions. In the example, the outer housing 188 rotates a similar 180° with the sleeve 152 between the two backset positions.

Figure 15:
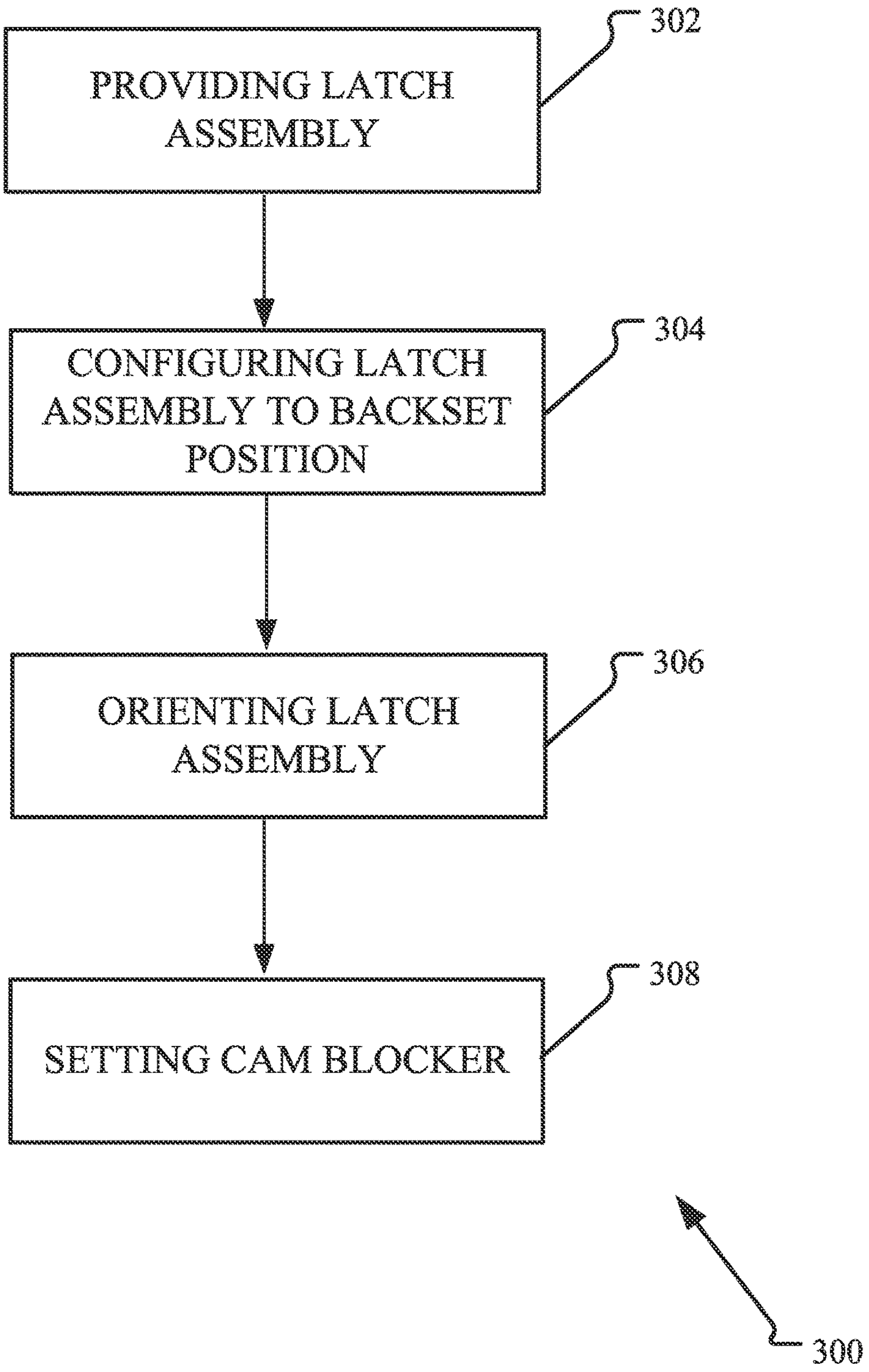
FIG. 15 illustrates a flowchart depicting a method of installing a latch assembly on a door.

FIG. 15 illustrates a flowchart depicting a method 300 of installing a latch assembly on a door. The examples methods and operations can be implemented or performed by the assemblies described herein (e.g., the latch assembly 100 shown in FIGS. 1-14). The method 300 begins with providing the latch assembly (operation 302). In the example, the latch assembly includes a housing, a sleeve coupled to a face plate at a first end of the housing, a bolt extendable and retractable relative to the first end of the housing and having an oblique surface, a cam rotatably mounted to the housing and defining a rotation axis, a slide arm assembly coupling the cam to the bolt, and a cam blocker.

The latch assembly is configured to a first backset position (operation 304). The first backset position being defined by rotating the sleeve relative to the first end of the housing. In examples, rotating the sleeve relative to the first end of the housing also rotates the oblique surface of the bolt relative to the first end of the housing. In an aspect, rotation of the sleeve and the oblique surface may be about 180° relative to the housing. Rotation of the sleeve and the oblique surface also include longitudinal movement so that the backset position of the latch assembly is adjustable.

Once the backset position of the latch assembly is configured, the latch assembly is oriented relative to a swing orientation of the door (operation 306). The swing orientation of the door may be based on how the door is hung and which side of the door is configured to be secured. In examples, orienting the latch assembly relative to the swing orientation of the door includes positioning the oblique surface relative to a keeper mounted on a door jamb so that the latch assembly facilitates automatic engagement of the keeper with the bolt when the door closes and without use of the handle assembly.

Additionally, the cam blocker of the latch assembly is set to one of a knob configuration and a lever configuration (operation 308). As described herein, when the latch assembly is in the knob configuration, the cam is rotatable in both directions around the rotation axis to drive actuation of the slide arm assembly and retraction movement of the bolt, and when in the latch assembly is in the lever configuration, the cam is rotatable in only a single direction around the rotation axis to drive actuation of the slide arm assembly and retraction movement of the bolt. Setting the cam blocker to different configurations may include sliding a pin within a C-shaped slot defined within the housing with the pin coupled to a biasing block.

The latch assembly described herein facilitates adjustability to different configurations and so that the latch assembly can be used with a variety of different actuation (e.g., handle) configurations and different backset distances. The latch assembly includes a cam blocker that can be selectively positioned so that full rotation of a cam is enabled or restricted rotation of the cam is enabled. This allows for the latch assembly to be used for knob-type handle configurations, whereby knob rotation in both directions is required or desired, and for the latch assembly to be used for lever-type handle configurations, whereby lever rotation in only a single direction is required or desired. Additionally, the latch assembly includes a bolt having an oblique surface so that the latch assembly can automatically engage a keeper when the door is being closed. The features of the oblique surface is enabled for different backset distances and while the bolt is being extended relative to the housing. Both the cam blocker and the backset features are accessible from the exterior of the latch assembly so that the adjustments of the latch assembly may be easily done on-site and in the field by the installers.

EXAMPLES

Illustrative examples of the latch assembly disclosed herein are provided below. An embodiment of the latch assembly may include any one or more, and any combination of, the examples described below.

Example 1. A latch assembly comprising:

a housing having a first end and an opposite second end, the first end and the second end defining a longitudinal axis, the housing also having a first horizontal sidewall and an opposite second horizontal sidewall;

a bolt slidably mounted at least partially within the housing at the first end, the bolt selectively moveable between at least an extended position and a retracted position relative to the first end of the housing;

a cam rotatably mounted at least partially within the housing proximate the second end, the cam selectively rotatable around a rotation axis, the rotation axis substantially orthogonal to the longitudinal axis and substantially parallel to the first and second horizontal sidewalls of the housing, wherein the cam includes at least one radial projection;

a slide arm assembly coupling the bolt with the cam such that rotation of the cam around the rotation axis drives movement of the bolt along the longitudinal axis; and a cam blocker mounted to the housing and configured to selectively engage with the at least one radial projection of the cam, the cam blocker positionable in at least a first position, whereby the cam is freely rotatably in both directions around the rotation axis and towards both the first and second horizontal sidewalls of the housing, and a second position, whereby the cam blocker selectively engages with the at least one radial projection so as to block rotation of the cam around the rotation axis relative to the first horizontal sidewall of the housing.

Example 2. The latch assembly of any one of Examples 1-20, wherein the cam blocker is positionable in a third position, wherein in the third position the cam blocker selectively engages with the at least one radial projection so as to block rotation of the cam around the rotation axis relative to the second horizontal sidewall of the housing.

Example 3. The latch assembly of any one of Examples 1-20, wherein the first position of the cam blocker is located between the second and third positions of the cam blocker.

Example 4. The latch assembly of any one of Examples 1-20, wherein the cam blocker includes a pin substantially parallel to the rotation axis and slidably mounted to the housing.

Example 5. The latch assembly of any one of Examples 1-20, wherein the housing defines at least one slot configured to receive at least a portion of the pin, the at least one slot being substantially C-shaped.

Example 6. The latch assembly of any one of Examples 1-20, wherein the cam blocker further includes a biasing block biasing the pin towards the cam along the longitudinal axis.

Example 7. The latch assembly of any one of Examples 1-20, wherein the latch assembly has an adjustable backset between at least two different backset positions.

Example 8. The latch assembly of any one of Examples 1-20, further comprising a sleeve rotatably mounted at the first end of the housing, wherein rotation of the sleeve in a first direction around the longitudinal axis extends the sleeve and at least a portion of the bolt relative to the first end of the housing, and rotation of the sleeve in an opposite second direction around the longitudinal axis retracts the sleeve and at least a portion of the bolt relative to the first end of the housing.

Example 9. The latch assembly of any one of Examples 1-20, wherein rotation of the sleeve corresponds to rotation of at least a portion of the bolt around the longitudinal axis.

Example 10. The latch assembly of any one of Examples 1-20, wherein the bolt includes an oblique surface, the oblique surface facing a first direction when the sleeve and the bolt are extended relative to the first end of the housing and facing an opposite second direction when the sleeve and the bolt are retracted relative to the first end of the housing.

Example 11. The latch assembly of any one of Examples 1-20, wherein the bolt includes an outer housing and an inner body, the inner body coupled to the slide arm assembly and having a helical groove such that the outer housing is rotatable relative to the inner body.

Example 12. A latch assembly comprising:

a housing defining a longitudinal axis;

a bolt slidably mounted at least partially within the housing and moveable between at least an extended position and a retracted position along the longitudinal axis;

a cam rotatably mounted at least partially within the housing, the cam configured to couple to a torque blade rotatable around a rotation axis substantially orthogonal to the longitudinal axis;

a slide arm assembly coupling the bolt with the cam such that rotation of the torque blade drives movement of the bolt;

a sleeve rotatably mounted to the housing proximate the bolt, wherein a rotation position of the sleeve relative to the housing defines a backset position of the latch assembly; and a cam blocker selectively engageable with the cam and positionable between at least a knob configuration and a lever configuration, wherein when in the knob configuration, the cam is rotatable in both directions around the rotation axis to drive actuation of the slide arm assembly and movement of the bolt towards the retracted position, and wherein when in the lever configuration, the cam is rotatable in only a single direction around the rotation axis to drive actuation of the slide arm assembly and movement of the bolt towards the retracted position.

Example 13. The latch assembly of any one of Examples 1-20, wherein the cam blocker includes a pin slidable on a C-shaped slot defined in the housing, the pin biased by a biasing block along the longitudinal axis, the lever configuration defined by the pin positioned at one of the ends of the C-shaped slot and the knob configuration defined by the pin centered within the C-shaped slot.

Example 14. The latch assembly of any one of Examples 1-20, wherein the lever configuration includes a first lever configuration having the pin positioned at a first end of the C-shaped slot and preventing rotation of the cam in a first direction around the rotation axis and a second lever configuration having the pin positioned at a second end of the C-shaped slot and preventing rotation of the cam in an opposite second direction around the rotation axis.

Example 15. The latch assembly of any one of Examples 1-20, wherein the bolt includes an outer housing and an inner body, the outer housing rotatable relative to the inner body, the inner body coupled to the slide arm assembly, and wherein rotation of the sleeve relative to the housing rotates the outer housing relative to the inner body.

Example 16. The latch assembly of any one of Examples 1-20, wherein rotation of the outer housing relative to the inner body moves the outer housing relative to the inner body along the longitudinal axis.

Example 17. A method of installing a latch assembly on a door, the method comprising:

providing the latch assembly that includes a housing, a sleeve coupled to a face plate at a first end of the housing, a bolt extendable and retractable relative to the first end of the housing and having an oblique surface, a cam rotatably mounted to the housing and defining a rotation axis, a slide arm assembly coupling the cam to the bolt, and a cam blocker;

configuring the latch assembly to a first backset position, wherein the first backset position is defined by rotating the sleeve relative to the first end of the housing;

orienting the latch assembly relative to a swing orientation of the door; and setting the cam blocker to one of a knob configuration and a lever configuration, wherein when in the knob configuration, the cam is rotatable in both directions around the rotation axis to drive actuation of the slide arm assembly and retraction movement of the bolt, and wherein when in the lever configuration, the cam is rotatable in only a single direction around the rotation axis to drive actuation of the slide arm assembly and retraction movement of the bolt.

Example 18. The method of any one of Examples 1-20, wherein rotating the sleeve relative to the first end of the housing further comprises rotating the oblique surface of the bolt relative the first end of the housing.

Example 19. The method of any one of Examples 1-20, wherein orienting the latch assembly relative to the swing orientation of the door includes positioning the oblique surface relative to a keeper mounted on a door jamb.

Example 20. The method of any one of Examples 1-20, wherein setting the cam blocker to one of the knob configuration and the lever configuration includes sliding a pin within a C-shaped slot defined within the housing, the pin coupled to a biasing block.

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, may not be included or may be combined with other features.

References in the specification to "one example," "an example," "an illustrative example," etc., indicate that the example described may include a particular feature, structure, or characteristic, but every example may or may not necessarily include that particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). Moreover, one having skill in the art will understand the degree to which terms such as "about," "approximately," or "substantially" convey in light of the measurement techniques utilized herein. To the extent such terms may not be clearly defined or understood by one having skill in the art, the term "about" shall mean plus or minus ten percent.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

What is claimed:

1. A latch assembly comprising:

a housing having a first end and an opposite second end, the first end and the second end defining a longitudinal axis, the housing also having a first horizontal sidewall and an opposite second horizontal sidewall;

a bolt slidably mounted at least partially within the housing at the first end, the bolt selectively moveable between at least an extended position and a retracted position relative to the first end of the housing;

a cam rotatably mounted at least partially within the housing proximate the second end, the cam selectively rotatable around a rotation axis, the rotation axis substantially orthogonal to the longitudinal axis and substantially parallel to the first and second horizontal sidewalls of the housing, wherein the cam includes at least one radial projection;

a slide arm assembly coupling the bolt with the cam such that rotation of the cam around the rotation axis drives movement of the bolt along the longitudinal axis; and a cam blocker mounted to the housing and configured to selectively engage with the at least one radial projection of the cam, the cam blocker positionable in at least a first position, whereby the cam is freely rotatably in both directions around the rotation axis and towards both the first and second horizontal sidewalls of the housing, and a second position, whereby the cam blocker selectively engages with the at least one radial projection so as to block rotation of the cam around the rotation axis relative to the first horizontal sidewall of the housing.

2. The latch assembly of claim 1, wherein the cam blocker is positionable in a third position, wherein in the third position the cam blocker selectively engages with the at least one radial projection so as to block rotation of the cam around the rotation axis relative to the second horizontal sidewall of the housing.

3. The latch assembly of claim 2, wherein the first position of the cam blocker is located between the second and third positions of the cam blocker.

4. The latch assembly of claim 1, wherein the cam blocker includes a pin substantially parallel to the rotation axis and slidably mounted to the housing.

5. The latch assembly of claim 4, wherein the housing defines at least one slot configured to receive at least a portion of the pin, the at least one slot being substantially C-shaped.

6. The latch assembly of claim 4, wherein the cam blocker further includes a biasing block biasing the pin towards the cam along the longitudinal axis.

7. The latch assembly of claim 1, wherein the latch assembly has an adjustable backset between at least two different backset positions.

8. The latch assembly of claim 1, further comprising a sleeve rotatably mounted at the first end of the housing, wherein rotation of the sleeve in a first direction around the longitudinal axis extends the sleeve and at least a portion of the bolt relative to the first end of the housing, and rotation of the sleeve in an opposite second direction around the longitudinal axis retracts the sleeve and at least a portion of the bolt relative to the first end of the housing.

9. The latch assembly of claim 8, wherein rotation of the sleeve corresponds to rotation of at least a portion of the bolt around the longitudinal axis.

10. The latch assembly of claim 8, wherein the bolt includes an oblique surface, the oblique surface facing a first direction when the sleeve and the bolt are extended relative to the first end of the housing and facing an opposite second direction when the sleeve and the bolt are retracted relative to the first end of the housing.

11. The latch assembly of claim 8, wherein the bolt includes an outer housing and an inner body, the inner body coupled to the slide arm assembly and having a helical groove such that the outer housing is rotatable relative to the inner body.

12. A latch assembly comprising:

a housing defining a longitudinal axis;

a bolt slidably mounted at least partially within the housing and moveable between at least an extended position and a retracted position along the longitudinal axis;

a cam rotatably mounted at least partially within the housing, the cam configured to couple to a torque blade rotatable around a rotation axis substantially orthogonal to the longitudinal axis;

a slide arm assembly coupling the bolt with the cam such that rotation of the torque blade drives movement of the bolt;

a sleeve rotatably mounted to the housing proximate the bolt, wherein a rotation position of the sleeve relative to the housing defines a backset position of the latch assembly; and a cam blocker selectively engageable with the cam and positionable between at least a knob configuration and a lever configuration, wherein when in the knob configuration, the cam is rotatable in both directions around the rotation axis to drive actuation of the slide arm assembly and movement of the bolt towards the retracted position, and wherein when in the lever configuration, the cam is rotatable in only a single direction around the rotation axis to drive actuation of the slide arm assembly and movement of the bolt towards the retracted position.

13. The latch assembly of claim 12, wherein the cam blocker includes a pin slidable on a C-shaped slot defined in the housing, the pin biased by a biasing block along the longitudinal axis, the lever configuration defined by the pin positioned at one of the ends of the C-shaped slot and the knob configuration defined by the pin centered within the C-shaped slot.

14. The latch assembly of claim 13, wherein the lever configuration includes a first lever configuration having the pin positioned at a first end of the C-shaped slot and preventing rotation of the cam in a first direction around the rotation axis and a second lever configuration having the pin positioned at a second end of the C-shaped slot and preventing rotation of the cam in an opposite second direction around the rotation axis.

15. The latch assembly of claim 12, wherein the bolt includes an outer housing and an inner body, the outer housing rotatable relative to the inner body, the inner body coupled to the slide arm assembly, and wherein rotation of the sleeve relative to the housing rotates the outer housing relative to the inner body.

16. The latch assembly of claim 15, wherein rotation of the outer housing relative to the inner body moves the outer housing relative to the inner body along the longitudinal axis.

17. A method of installing a latch assembly on a door, the method comprising:

providing the latch assembly that includes a housing, a sleeve coupled to a face plate at a first end of the housing, a bolt extendable and retractable relative to the first end of the housing and having an oblique surface, a cam rotatably mounted to the housing and defining a rotation axis, a slide arm assembly coupling the cam to the bolt, and a cam blocker;

configuring the latch assembly to a first backset position, wherein the first backset position is defined by rotating the sleeve relative to the first end of the housing;

orienting the latch assembly relative to a swing orientation of the door; and setting the cam blocker to one of a knob configuration and a lever configuration, wherein when in the knob configuration, the cam is rotatable in both directions around the rotation axis to drive actuation of the slide arm assembly and retraction movement of the bolt, and wherein when in the lever configuration, the cam is rotatable in only a single direction around the rotation axis to drive actuation of the slide arm assembly and retraction movement of the bolt.

18. The method of claim 17, wherein rotating the sleeve relative to the first end of the housing further comprises rotating the oblique surface of the bolt relative the first end of the housing.

19. The method of claim 18, wherein orienting the latch assembly relative to the swing orientation of the door includes positioning the oblique surface relative to a keeper mounted on a door jamb.

20. The method of claim 17, wherein setting the cam blocker to one of the knob configuration and the lever configuration includes sliding a pin within a C-shaped slot defined within the housing, the pin coupled to a biasing block.

* * * * *